(12) United States Patent
Huang et al.

(10) Patent No.: US 6,719,259 B2
(45) Date of Patent: Apr. 13, 2004

(54) ADJUSTABLE BOARD SUPPORT FOR EASEL

(76) Inventors: Jason Huang, 235 Chung - Ho Box 8-24, Taipei (TW); Pao Pei-Chih, 2F, No. 118, Chengtu Rd., Hsitun Dist, Taichung (TW)

(*) Notice: Subject to any disclaimer, the term of this patent is extended or adjusted under 35 U.S.C. 154(b) by 0 days.

(21) Appl. No.: 10/194,468

(22) Filed: Jul. 15, 2002

(65) Prior Publication Data

US 2003/0122052 A1 Jul. 3, 2003

(30) Foreign Application Priority Data

Dec. 28, 2001 (TW) .................................. 90224417 U (51) Int. Cl.[7] .............................. A47B 97/04; F16B 7/08
(52) U.S. Cl. .................... 248/441.1; 248/462; 248/407; 248/230.2; 248/231.31; 248/230.4; 248/231.51; 248/316.5; 403/187; 403/93; 403/315; 403/321
(58) Field of Search ........................... 248/441.1, 462, 248/229.21, 229.11, 230.2, 230.4, 231.31, 231.51, 230.1, 230.7, 231.81, 227.3, 227.4, 292.13, 316.2, 316.5, 74.2, 217.1, 218.4, 221.11, 222.52, 229.13, 229.17, 229.23, 27.8, 407, 411, 412, 409; 403/187, 188, 279, 326, 83, 84, 91, 93, 97, 315, 316, 321

(56) References Cited

U.S. PATENT DOCUMENTS

| 2,123,695 | A | * | 7/1938 | Elmer | 248/230.2 |
|---|---|---|---|---|---|
| 2,185,782 | A | * | 1/1940 | Brittin | 24/457 |
| 2,849,249 | A | * | 8/1958 | Fridolph | 403/376 |
| 3,289,989 | A | * | 12/1966 | Ferenz | 248/27.8 |
| 3,604,734 | A | * | 9/1971 | Friedman et al. | 403/104 |
| 3,633,942 | A | * | 1/1972 | Meyerhoefer | 285/7 |
| 4,017,049 | A | * | 4/1977 | Albee, Jr. | 248/464 |
| 4,171,116 | A | * | 10/1979 | Carver et al. | 248/464 |
| 4,318,527 | A | * | 3/1982 | Smith | 248/459 |
| 4,326,687 | A | * | 4/1982 | Clyburn | 248/168 |
| 4,596,484 | A | * | 6/1986 | Nakatani | 403/104 |
| 4,761,092 | A | * | 8/1988 | Nakatani | 403/104 |
| 4,932,622 | A | * | 6/1990 | Hayakawa | 248/188.5 |
| 5,125,613 | A | * | 6/1992 | Albee, Jr. et al. | 248/464 |
| 5,443,234 | A | * | 8/1995 | Woods | 248/246 |
| 6,142,699 | A | * | 11/2000 | Pao | 403/109.5 |
| 6,202,974 | B1 | * | 3/2001 | Rellinger | 248/460 |

* cited by examiner

Primary Examiner—Leslie A. Braun
Assistant Examiner—Naschica S. Morrison (57) ABSTRACT

An easel board support is installed on an easel supporting leg for suspending and supporting objects and the height thereof is adjustable. The easel board support comprises a sleeve and a board support body. The sleeve is capable of being inserted by an easel supporting leg and have two pivotal ears each having through hole. A part of the sleeve at an inner side of the pivotal ear has a slot. An elastic press is formed between the two slots. By a large contact surface between the press piece and the supporting leg, the board support is positioned stably; and by the resisting effect between a resisting block and the sleeve, the board support will not fall downwards. The press can be replaced by a receiving groove formed between the two pivotal ears and a cambered pressing block installed in the receiving groove.

6 Claims, 11 Drawing Sheets

Fig. 11
PRIOR ART

ADJUSTABLE BOARD SUPPORT FOR EASEL

FIELD OF THE INVENTION

The present invention relates to board supports, and particularly to a easel board support, wherein by a large contact surface between the press piece and the supporting leg, the board support is positioned stably; and by the resisting effect between a resisting block and the sleeve, the board support will not fall downwards.

BACKGROUND OF THE INVENTION

Figure 9:
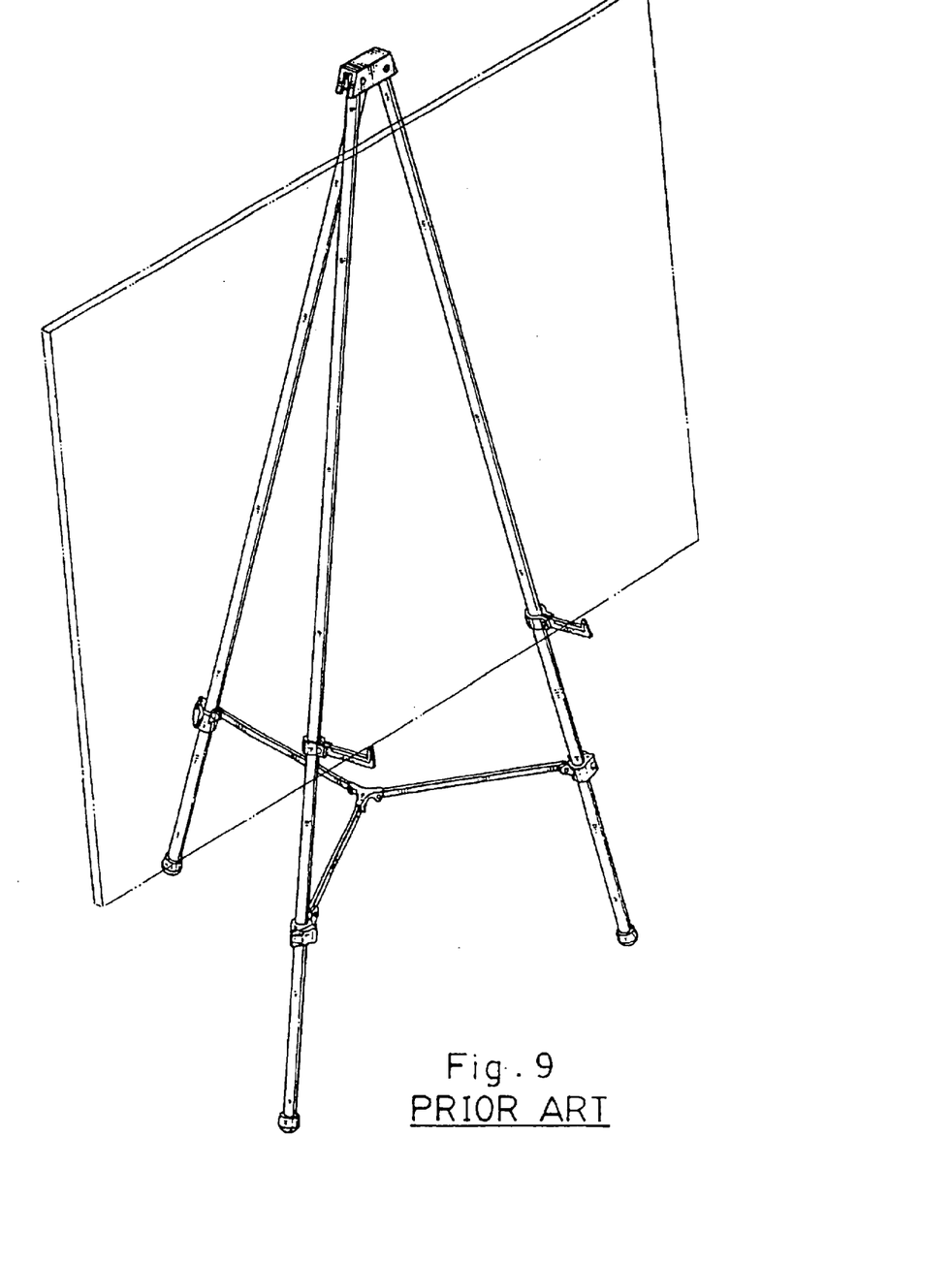
FIG. 9 is an assembled perspective view of a prior art easel.

Referring to FIG. 9, the current easel is illustrated. A plurality of supporting legs are used to form a supporting frame. Each of the supporting legs is installed with a board support the height of which is adjustable. Thereby, the board support serves to support or suspend objects.

Figure 10:
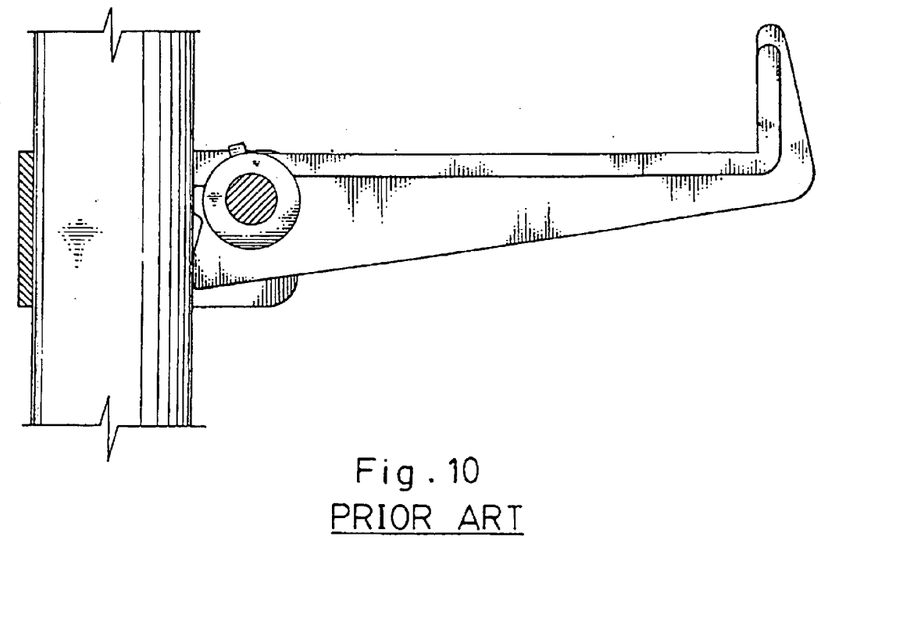
FIG. 10 is a lateral cross section view showing that the prior art board support is supported horizontally.
Figure 11:
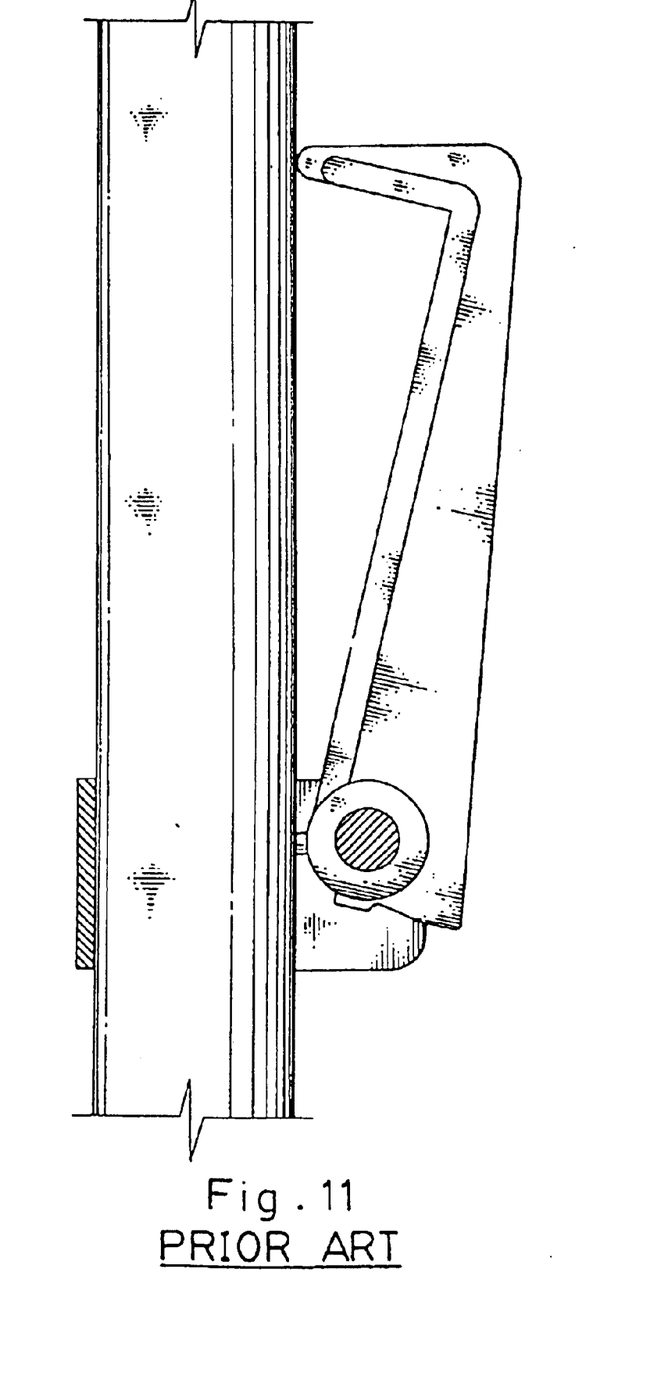
FIG. 11 is a lateral cross section view showing that a prior art board support is folded vertically.

The conventional board support can be a C shape ring or has a holder body. The end portion and top portion of the board support can be formed with a resisting edge and a protrusion, respectively, and then two sides thereof are pivotal installed to a ring. When the board support is rotated to be at a horizontal or vertical position, it can resist against the wall of the supporting leg through the resisting edge and the protrusion for positioning the board support (referring to FIGS. 10 and 11). However, the structure of the board support has the following disadvantage.

1. The board support is fixed through the resisting edge of the board support body or the protrusion to resist against the wall the supporting leg. Point or line contact is formed therebetween. The fixing effect is not preferred. Thereby, it is easy to release or slide as the board support body is pressed. Moreover, the wall of the supporting leg is easily deformed due to the pressing effect of the resisting edge.
2. The board support is fixed through the resisting edge of the board support body or the protrusion to resist against the wall the supporting leg. Point or line contact is formed therebetween. If the board support body is supported, the resisting edge and the protrusion are easily worn. Thereby, the board support body can not be positioned correctly and is easily inclined, even the supporting leg can not be positioned steadily.

SUMMARY OF THE INVENTION

Accordingly, the primary object of the present invention is to provide an easel board support installed to an easel supporting leg for suspending and supporting objects, the height of easel board support being adjustable.

The easel board support comprises a sleeve and a board support body; the sleeve is capable of being inserted by an easel supporting leg and have two pivotal ears each having a through hole; a part of the sleeve at an inner side of the pivotal ear has a slot; an elastic press is formed between the two slots; a positioning groove is formed in a predetermined position of the press; another end of the board support body has a pivotal seat with an axial hole; a surface of the pivotal seat facing the sleeve and a top surface of the pivotal seat have a first and a second protrusions; a lower side of the protrusion on the surface of the pivotal seat has a resisting block; thereby, when the two pivotal ears are pivotally installed to the pivotal seat; when the first protrusion and the board support body are horizontally arranged; the first protrusion resists against the press of the sleeve so that the press resists against the easel supporting leg. By a large contact surface between the press piece and the supporting leg, the board support is positioned stably; and by the resisting effect between the resisting block and an outer wall of the sleeve, the board support will not fall downwards so as to increase the supporting strength.

In above mentioned exampled, the press can be replaced by a receiving groove is formed between the two pivotal ears; and a cambered pressing block is installed in the receiving groove.

The various objects and advantages of the present invention will be more readily understood from the following detailed description when read in conjunction with the appended drawing.

DETAILED DESCRIPTION OF THE PREFERRED EMBODIMENTS

Figure 1:
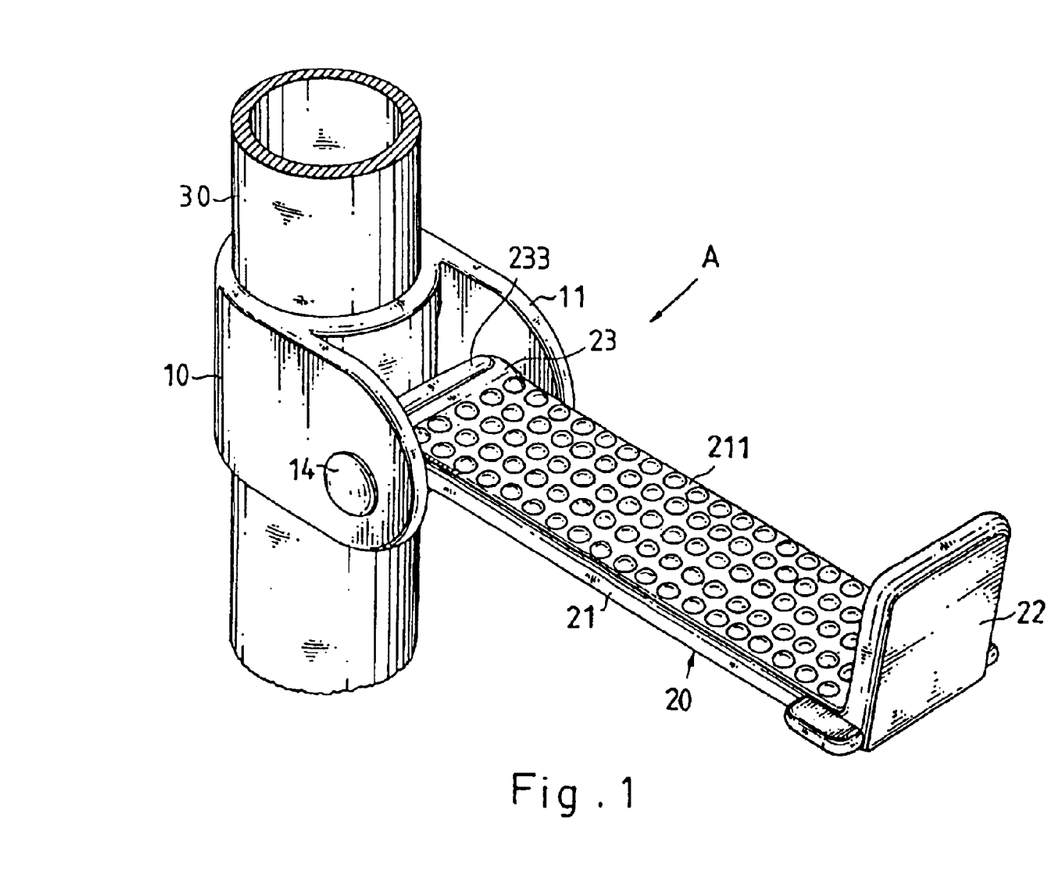
FIG. 1 is an assembled perspective view of the easel board support of the present invention.
Figure 2:
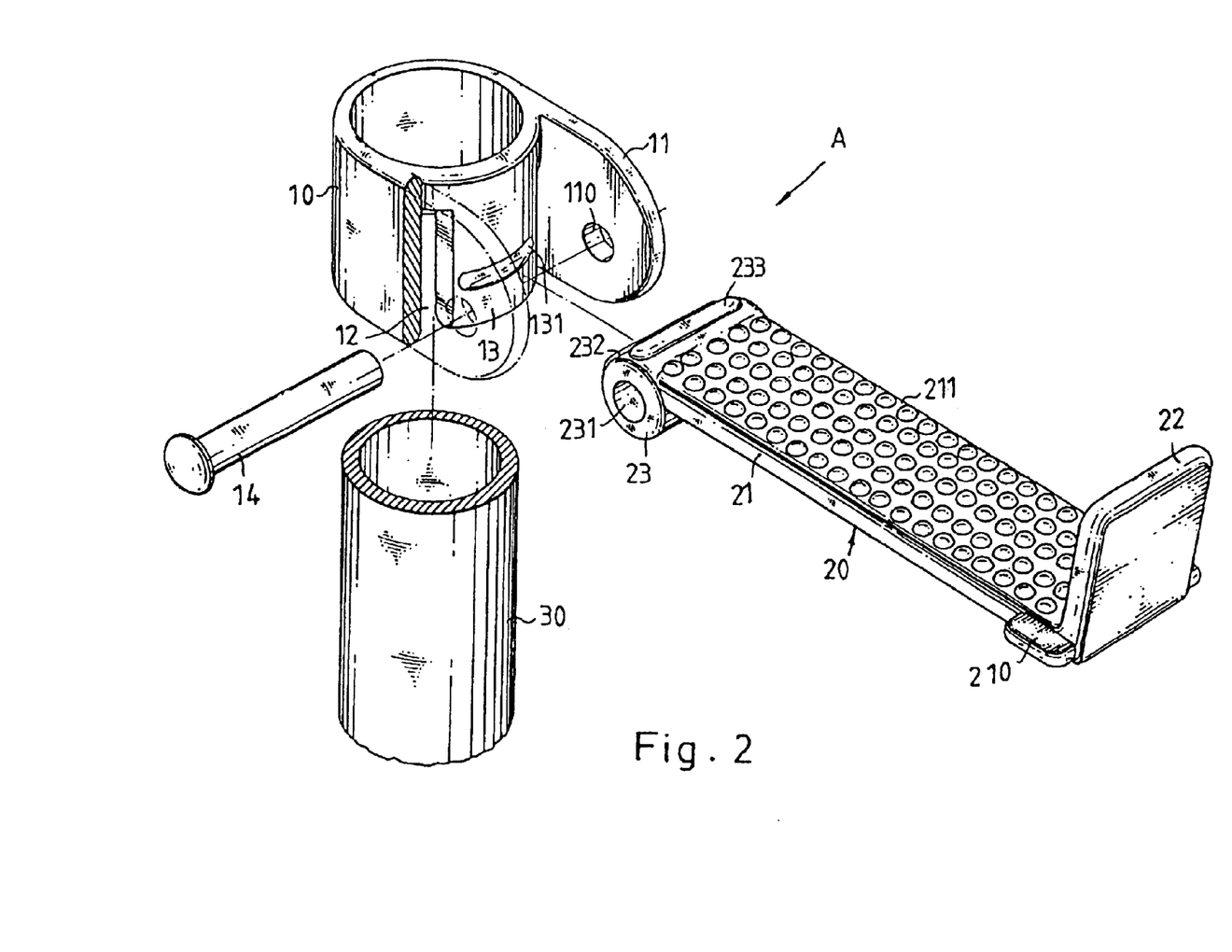
FIG. 2 is an exploded perspective view of the easel board support of the present invention.
Figure 3:
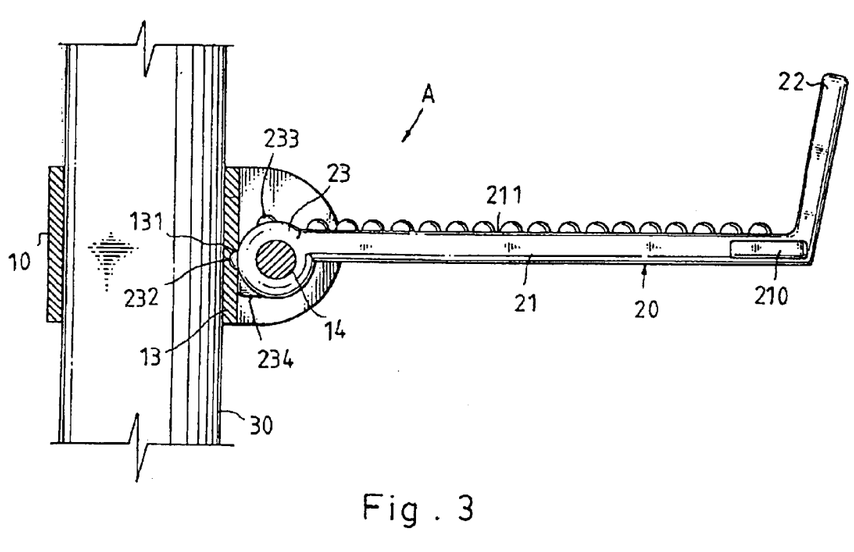
FIG. 3 is a lateral cross section view of the board support of the present invention.
Figure 4:
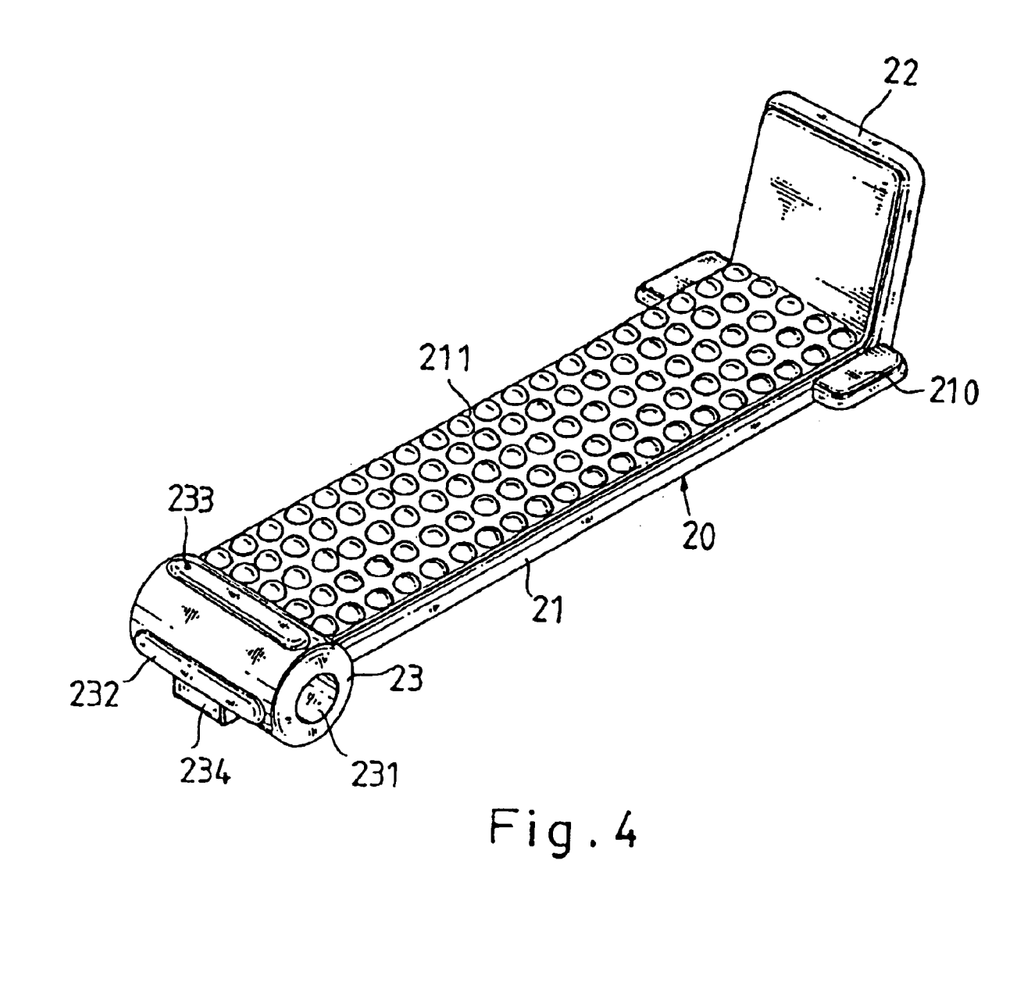
FIG. 4 is a perspective view of the board support of the present invention.

With reference to FIGS. 1, 2 and 3, the easel board support of the present invention is illustrated. The present invention includes a sleeve 10 and a board support body 20. The sleeve 10 can be inserted by an easel supporting leg 30 and have two pivotal ears 11 each having through hole 110 and extending from a tangent direction of the outer surface of the sleeve 10. The part of the sleeve 10 at the inner side of the pivotal ear has a slot 12. An elastic press 13 is formed between the two slots 12. A positioning groove 131 is formed in a predetermined position of the press 13. A distal end of the board support body 20 has a rectangular supporting plate 21. The two sides of the rectangular supporting plate 21 have respective plate piece 210. A top of the rectangular supporting plate 21 is installed with a stop surface 211. The end of the rectangular supporting plate 21 having a board support portion 22 and another end thereof has a tubular pivotal seat 23 with an axial hole 231. A stud 14 passes through the through holes 110 of the pivotal ears 11. The surface of the pivotal seat 23 facing the sleeve 10 and the top surface of the pivotal seat 23 have respective protrusions 232, 233. The first ejecting protrusion 232 is used to resist against the positioning groove 131 of the press 13 of the sleeve 10. Then pressed press 13 presses the wall of the easel supporting leg 30 so as to make the board support A stable. At the same time, a lower side of the first protrusion 232 has a resisting block 234. The vertical surface of the resisting block 234 resists against the wall of the sleeve 10. Thereby, the board support body 20 will not fall down so as to enhance the strength. The upper surface of the pivotal seat 23 has the second protrusion 233 for positioning the board support body 20 after the board support body 20 is folded for storage.

By above design, when the board support body 20 of the board support A rotates to a position so that the two protrusions 232, 233 of the pivotal seat 23 are exactly not resisted by the press 13 of the sleeve 10. Then, the press 13 is in a releasing condition. At this status, the sleeve 10 can slide freely so that the height of the board support A can be adjusted.

Figure 5:
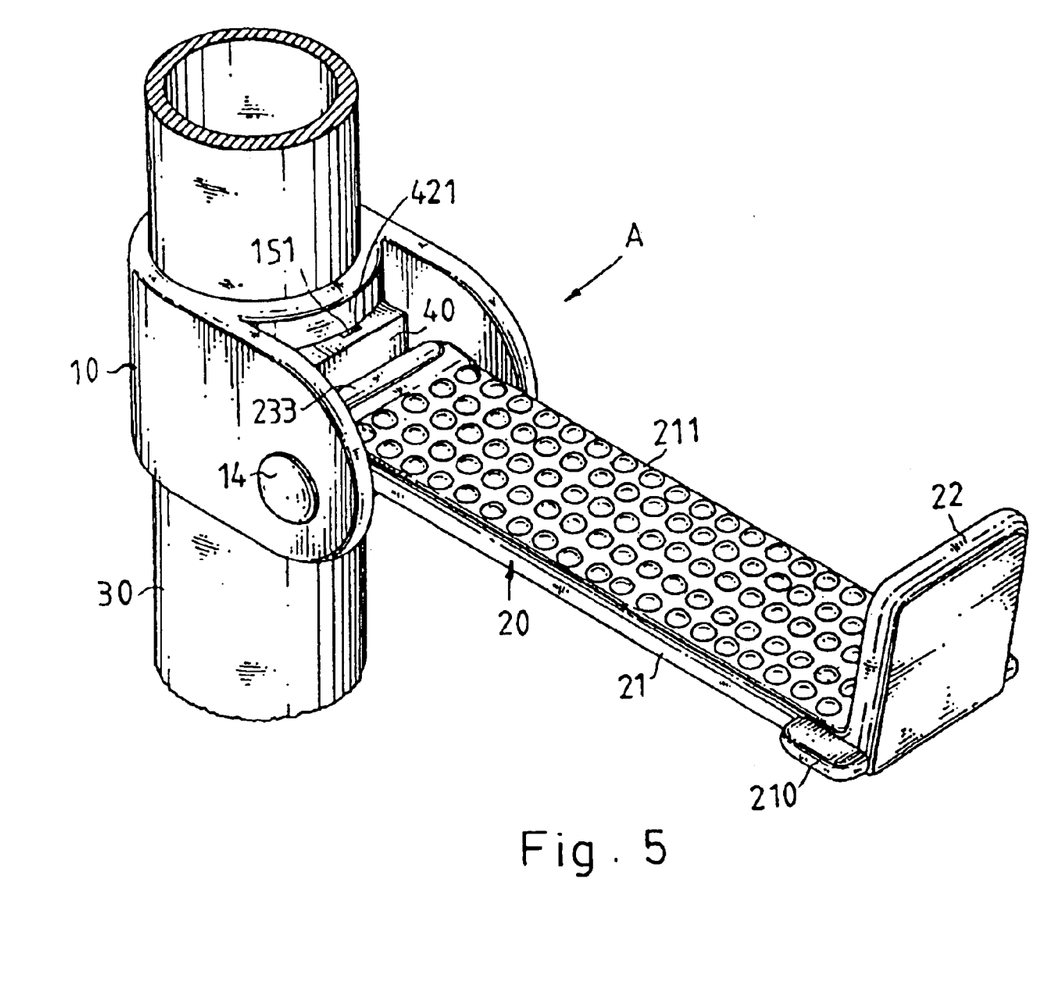
FIG. 5 is an assembled perspective view of the easel board support of another embodiment of the present invention.
Figure 6:
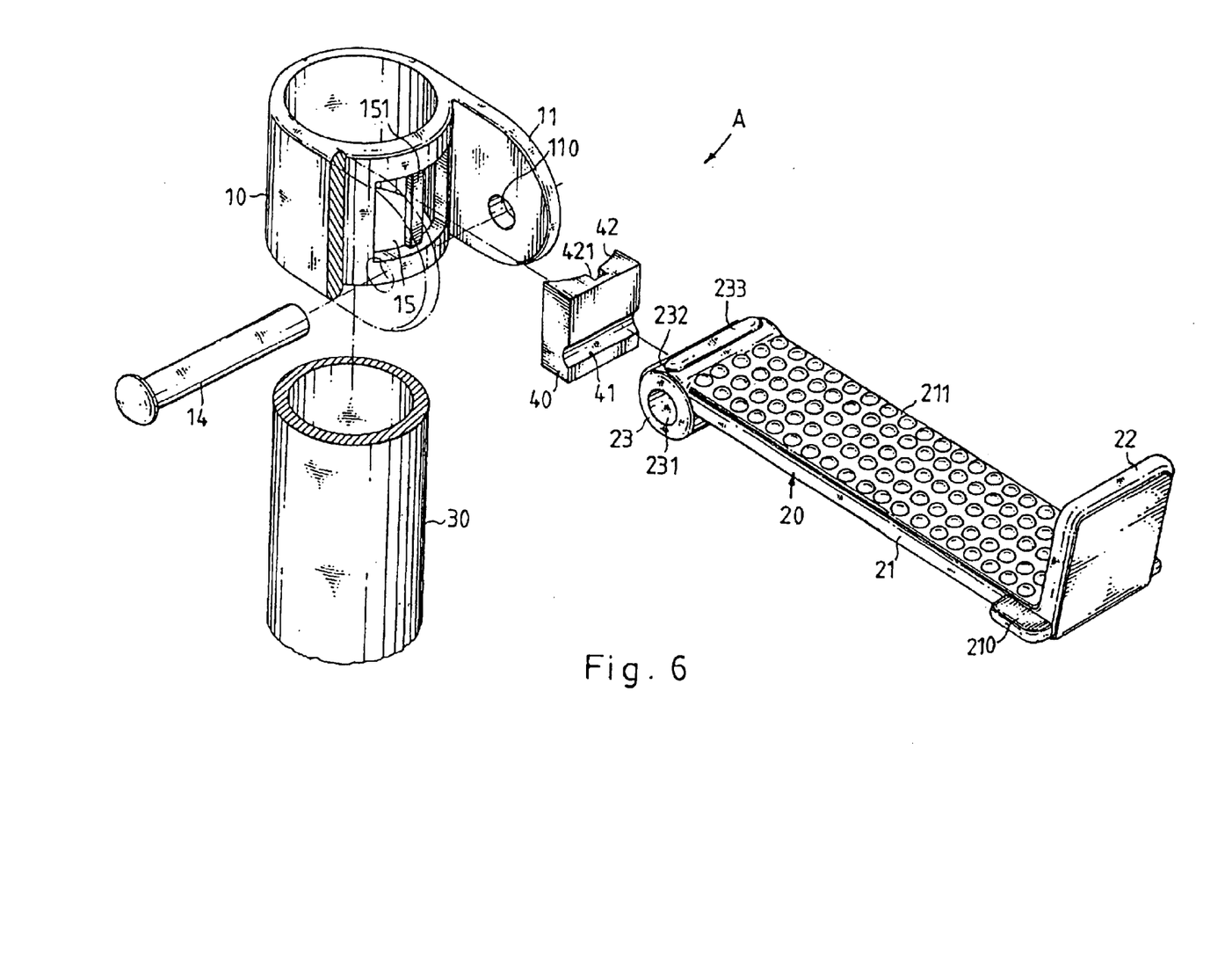
FIG. 6 is an exploded perspective view of the easel board support according to another embodiment of the present invention.
Figure 7:
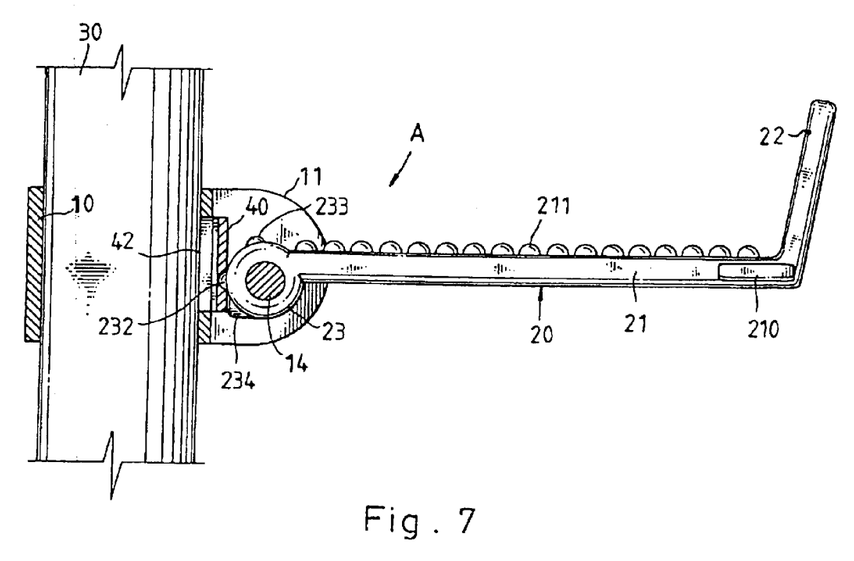
FIG. 7 is a lateral cross section view of the board support according to another embodiment of the present invention.

Referring to FIGS. 5 to 7, other than installing the slots 12 at the inner sides of the pivotal ears 11 so that a press 13 are formed between the two slots, in the sleeve 10 of the present invention, a receiving groove 15 can be formed between the two pivotal ears 11. A pressing block 40 can be installed in the receiving groove 15. Then the outer wall of the pressing block 40 is formed with a transversal positioning groove 41. Thereby, the pressing block 40 will move inwards so that the cambered concave surface 42 will resist against the easel supporting leg 30, thereby, acquiring a preferred stability. Then, the receiving groove 15 and the cambered concave surface 42 are formed with a positioning block 151 and a positioning trench 421, respectively, which are conformed to one another so as to prevent the pressing block 40 from falling into the sleeve 10 in assembly.

Figure 8:
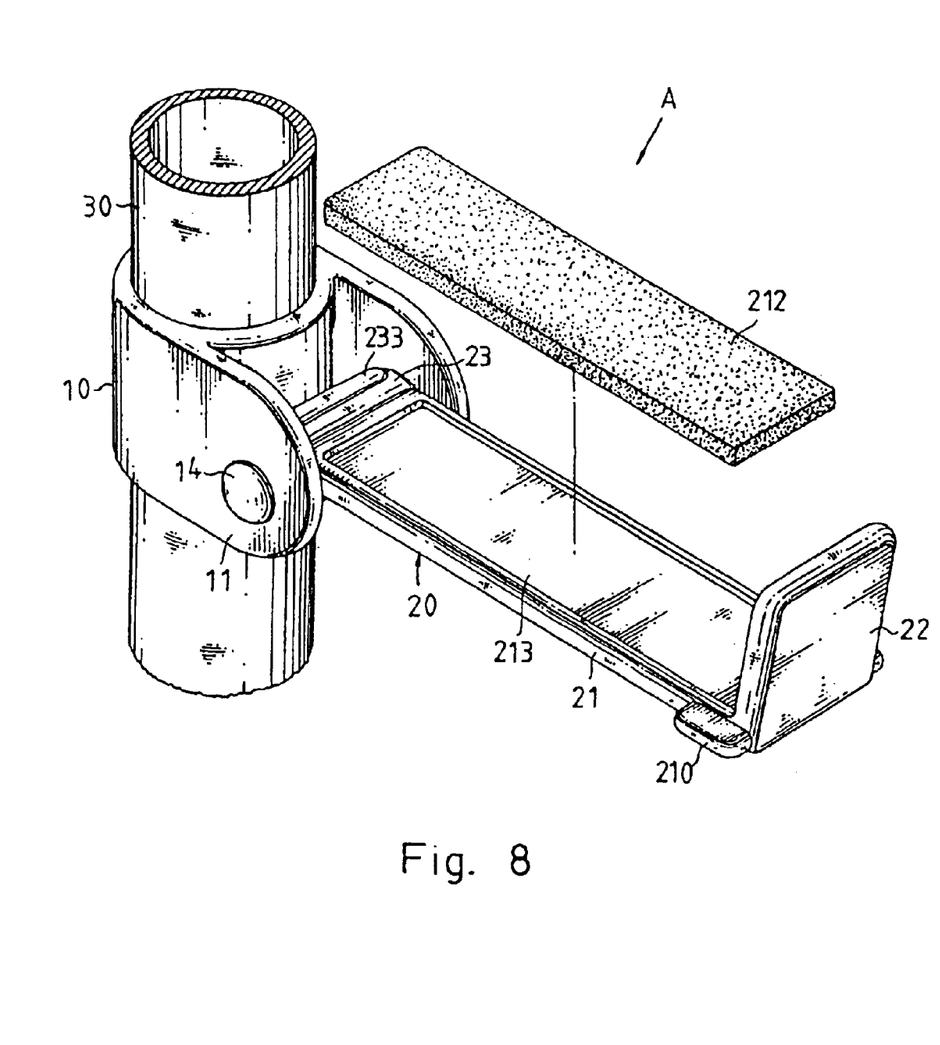
FIG. 8 is an exploded perspective view showing that the present invention is used with a stop pad.

Moreover, referring to FIG. 8, the stop surface 211 of the rectangular supporting plate 21 of the board support body 20 may be replaced by a stop pad 212 on a positioning surface 213 at the top of the rectangular supporting plate 21. The stop pad 212 is formed by foam, rubber or plastics.

The advantages of the present invention will be described herein.
1. The board support of the present invention is stable: Since the board support body of the present invention presses against the sleeve through the pressing piece and then a larger area cambered surface is formed, while in the prior art, a protrusion resists against a leg directly. Thereby, the present invention has a stable structure.
2. Low wearing effect: Since in the present invention, the pressing press or pressing block, and the wall of the easel supporting leg have cambered surfaces which have less wearing effect than the prior art design.
3. No deformation of the easel supporting leg occurs: In the present invention, the pressing press or pressing block, and the wall of the easel supporting leg are combined by adhering directly. Thereby, when the easel supporting leg is pressed, no deformation occurs.

In summary, the easel board support of the present invention is formed by a sleeve and a board support. Since the board support body of the present invention presses against the sleeve through the pressing piece and then a larger area cambered surface is used, the board support body is stable in the horizontal and vertical directions. The supporting strength is increased.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An easel board support installed to an easel supporting leg for suspending and supporting objects, the height of easel board support being adjustable; characterized in that:
the easel board support comprises a sleeve and a board support body; the sleeve is capable of being inserted by an easel supporting leg and have two pivotal ears; a receiving groove is formed between the two pivotal ears; a cambered pressing block is installed in the receiving groove; another end of the board support body has a pivotal seat with an axial hole; a surface of the pivotal seat facing the sleeve and a top surface of the pivotal seat have respective first and second protrusions; a lower side of the protrusion on the surface of the pivotal seat has a resisting block; thereby, when the two pivotal ears are pivotally installed to the pivotal seat and the first protrusion and the board support body are horizontally arranged; the first protrusion resists against the press of the sleeve so that the press resists against the easel supporting leg; by a large contact surface between the pressing block and the supporting leg, the board support is positioned stably; and by the resisting effect between the resisting block and an outer wall of the sleeve, the board support will not fall downwards so as to increase the supporting strength;
the receiving groove and the cambered concave surface are formed with a positioning block and a positioning trench, respectively, which are conformed to one another so as to prevent the pressing block from falling into the sleeve in assembly.

2. The easel board support as claim in claim 1, wherein when the board support body is vertical arranged, the second protrusion at the top surface of the pivotal seat has a positioned effect.

3. The easel board support as claim in claim 1, wherein a predetermined position of the pressing piece is transversally arranged with a positioning groove for resisting against the protrusions so as to increase the buckling effect in the horizontal and vertical positions.

4. The easel board support as claim in claim 1, wherein a distal end of the board support body has a rectangular supporting plate; the two sides of the rectangular supporting plate have respective plate piece; a top of the rectangular supporting plate is installed with a stop surface; one end of the rectangular supporting plate is connected to the a board support portion.

5. The easel board support as claim in claim 1, wherein the stop surface of the rectangular supporting plate of the board support body is a top surface of a stop pad on the top of the rectangular supporting plate.

6. The easel board support as claim in claim 1, wherein the pivotal seat has a tubular shape.

* * * * *